United States Patent [19]

Frederiksen

[11] Patent Number: 5,247,355
[45] Date of Patent: Sep. 21, 1993

[54] GRIDLOCKED METHOD AND SYSTEM FOR VIDEO MOTION COMPENSATION

[75] Inventor: Jeffrey E. Frederiksen, Arlington Heights, Ill.

[73] Assignee: Northwest Starscan Limited Partnership, Kent, Wash.

[21] Appl. No.: 897,286

[22] Filed: Jun. 11, 1992

[51] Int. Cl.⁵ .............................................. H04N 7/137
[52] U.S. Cl. ...................................... 358/105; 358/136
[58] Field of Search ................................ 358/105, 136

[56] References Cited

U.S. PATENT DOCUMENTS 4,661,849  4/1987  Hinman .............................. 358/136
4,972,260  11/1990  Fujikawa et al. ................... 358/105

*Primary Examiner*—Tommy Chin
*Assistant Examiner*—Richard Lee

[57] ABSTRACT

A method and system for video motion compensation in which an overall interframe motion vector is divided into a relative block motion vector and a subblock motion vector. Image reconstruction is achieved by adjusting the delay between the synchronization pulse and the start of the pixel data according to the subblock motion vector, and accessing stored data from memory according to the relative block motion vector. Accessing memory in a block-quantized format ensures that page mode accesses are confined to the same memory row.

10 Claims, 7 Drawing Sheets

GRIDLOCKED METHOD AND SYSTEM FOR VIDEO MOTION COMPENSATION

BACKGROUND OF THE INVENTION

The present invention relates generally to signal processing and, more particularly, to a method and an apparatus for motion compensation of video images.

Motion compensation of video images refers to estimating and compensating the relative motion between adjacent video frames and is used as a method facilitating data compression or as a method for mitigating movement errors during conversion processes such as line number conversion or telecine. An encoder employing motion compensation may, therefore, reduce redundant information by estimating the interframe motion and passing this information to the decoder, which is able to use information already received for temporally antecedent frames in order to form the current frame. Furthermore, motion compensation may also reduce the number of bits required to encode interframe data by decreasing the magnitude of the interframe difference.

Typically, motion estimation for a frame is performed by subdividing the image into a plurality of regions, such as 8×8 pixel blocks, and a motion vector is determined for each block based on comparisons with displaced versions of the previous frame. Interframe difference information is calculated according to the appropriate block displacements indicated by the motion vectors.

Image reconstruction occurs by using the motion vector for each block in conjunction with interframe difference information. Inherently, this method requires random access of image data since contiguous blocks in one frame may no longer be contiguous in the subsequent frame due to their relative motion and is, therefore, not conducive to memory organization which would expedite image reconstruction and thereby ease hardware requirements and free time for alternative processing.

Employing motion compensation for data reduction is known in the art and U.S. Pat. No. 5,006,929 describes such a system which estimates local motion vectors and a global motion vector for each frame and calculates the difference between the global motion vector and each local vector for each frame. This method is well suited for variable length coding for the difference data and is also immune to frame-to-frame accumulative error. Although variable length coding reduces the data, this attribute occurs at the expense of additional hardware and processing time for the motion compensation.

A system applicable to converting from a high definition television (HDTV) signal having 1125 lines, 60 fields to a PAL signal having 625 lines, 50 fields is described in U.S. Pat. No. 4,731,651. This system provides for improved accuracy for vertical movement compensation, with ½ line resolution accomplished essentially by first forming two PAL frames from alternative lines of each HDTV frame, and then forming the output PAL frame by merging the appropriate lines from the two PAL frames based on the motion estimation to form a resulting output PAL frame with ½ line vertical resolution. This system is not adaptable, however, to ½ line vertical resolution for systems which do not convert from a source signal with approximately twice the vertical line resolution as the resultant signal.

In digital video transmission systems, not only is motion compensation an essential function in the data reduction process but also, for practical implementation it must be performed within the data rate limited video processing time and within the hardware cost limitations inherent to a system where each receiver contains motion compensation circuitry associated with the video decoder.

Accordingly, an object of the present invention is to provide a cost effective method and system for video motion compensation which reduces the amount of encoded information for transmission.

A further object of the present invention is to provide a video motion compensation method and system with ½ pixel horizontal and ½ line vertical resolution.

The foregoing specific objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art.

SUMMARY OF THE INVENTION

The above objects and advantages are achieved by a method and system for motion compensation which disregards individual block motion compensation and instead compensates motion for an entire frame relative to a previous frame. The blocks (or grids) which comprise the image are therefore constricted to the same displacement vector, easing motion estimation processing. Evidently, such a system furnishes compensation for pan and tilt but not zoom.

A salient feature inherent to the present invention is that the overall motion vector is divided into two motion vectors: the relative block displacement (RBD) vector and the absolute pixel adjustment (APA) vector. Image reconstruction is achieved by adjusting the synchronization pulse timing according to the subblock motion indicated by the APA vector, and accessing the stored image according to the offset indicated by the RBD vector coordinates. The combination of restricting the block motion to a common motion vector and accessing the stored image in a block-quantized format is referred to as a "gridlock" method. This "gridlocked" method is consistent with page mode memory access which refers to multiple column address strobes (CAS) for one row address strobe (RAS), reducing the overall memory access time. By allowing only full block motion relative to the reference buffer, the page mode memory accesses are assured to be constrained to the same physical memory row which not only further exploits page mode accessing but also, permits the use of dynamic random access memory (DRAM instead of significantly more expensive video RAM (VRAM) and reduces address circuitry complexity.

It will be appreciated by those skilled in the art that the foregoing brief description and the following detailed description are exemplary and explanatory of the present invention, but are not intended to be restrictive thereof or limiting of the advantages which can be achieved by the invention. Thus, the accompanying drawings, referred to herein and constituting a part hereof, illustrate preferred embodiments of the invention and, together with the detailed description, serve to explain the principles of the invention.

BRIEF DESCRIPTION OF THE DRAWINGS

The invention will be described in greater detail below by way of reference to the accompanying drawings, wherein.

DETAILED DESCRIPTION OF THE PREFERRED EMBODIMENT

Figure 1:
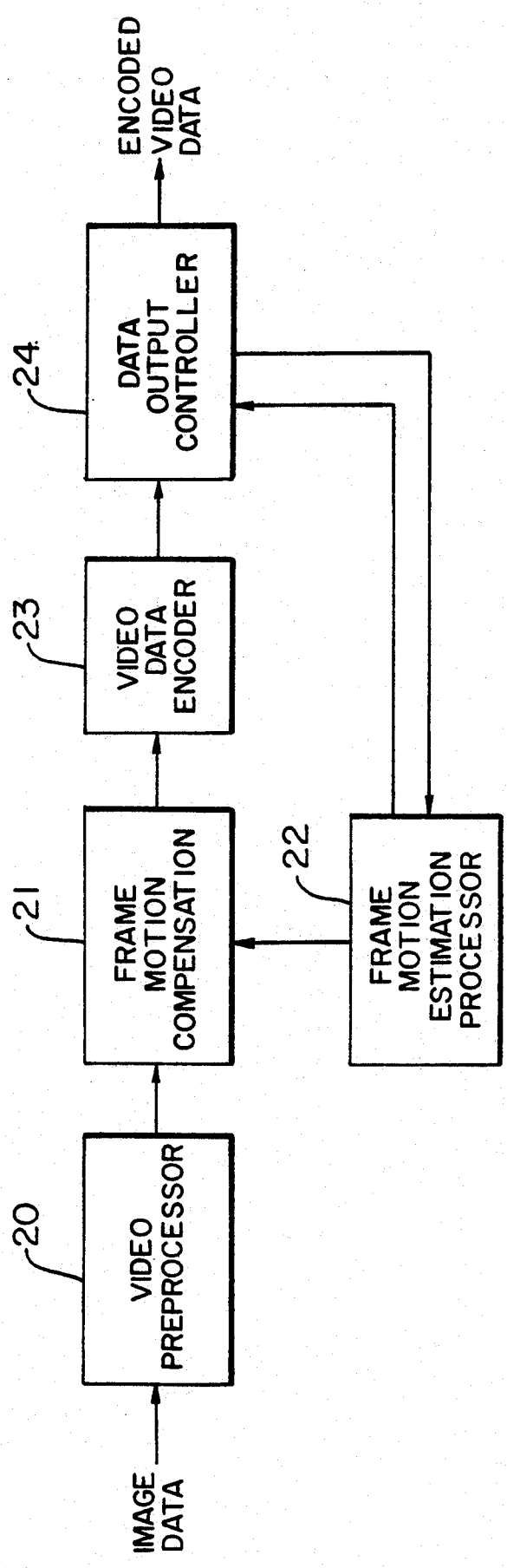
FIG. 1 is a functional block diagram of the motion compensation system components that are contained within a generalized encoder.

Referring now to the accompanying drawings, wherein like reference characters refer to like parts throughout the various views, there are shown in FIGS. 1-7 the preferred embodiments of the system and method for video motion compensation according to the present invention.

The present invention is intended for use in a line number conversion system or a telecine or preferably in a video encoder/decoder transmission system. The preferred embodiment is particularly adapted for the system comprising the digital video encoder disclosed in pending application entitled "Adaptive Hierarchical Subband Vector Quantization Encoder," Ser. No. 07/854,203 also of Jeffrey E. Frederiksen, and which is assigned to Northwest Starscan Limited Partnership, as is the current application, and which is incorporated herein to the current application by reference. The present invention, however, can be practiced in myriad video systems and is not limited by the referenced encoder system.

FIG. 1 is a functional block diagram of a generic video encoder which, for example, could be represented in detail by the above referenced video encoder employing motion compensation in accordance with the method and system disclosed herein subsequent to an overview of the generic video encoder/decoder system.

Given a source of video input data a video preprocessor 20 prepares the data for frame motion estimation processor 22 and frame motion compensation 21. Examples of video preprocessor 20 functions include analog-to-digital conversion, 30 fps (frames-per-second) to 24 fps conversion, and field-to-frame conversion. Given frame sequences, the frame motion estimation processor 22 calculates the relative motion between temporally adjacent frames and transfers this information to the data output controller 24 and to frame motion compensation circuitry 21 which reframes the video data.

In accordance with the referenced encoder application, the reframed data output by the frame motion compensation circuitry 21 alternates periodically between a spatial frame and a series of interframe spatial difference frames with the sequence interrupted and reset by a scene changes identified by the frame motion estimation processor 22. In addition, the data is output in block-raster format, each block composed of an 8×8 pixel array, and the video data encoder circuitry 23 performs a discrete cosine transform on each block followed by vector quantization of subbands of transform coefficients, and transfers this data to a data output controller 24.

The data output controller 24 regulates the data output by interaction with the video data encoder 23 and the frame motion estimation processor 22, and integrates the motion estimation parameters received from the frame motion estimation processor 22 into the data output stream which thus comprises the coded video data and the motion estimation data for each frame in addition to other data (e.g., audio and control) which is not explicitly shown in FIG. 1

Figure 2:
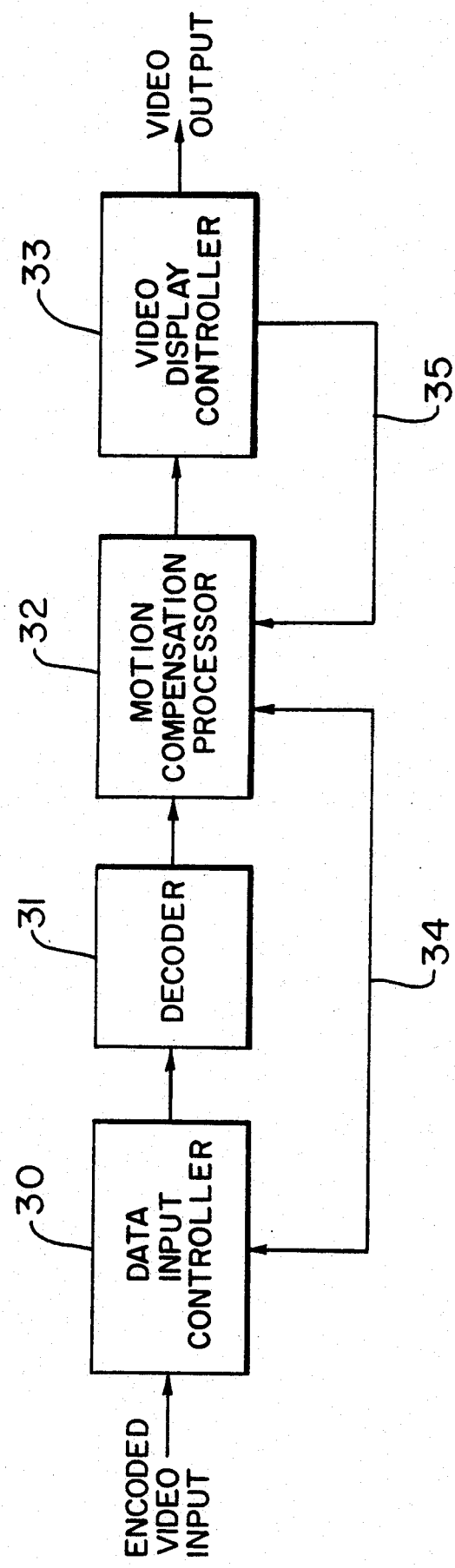
FIG. 2 is a functional block diagram of the motion compensation system components that are contained within a generalized decoder corresponding to the encoder of FIG. 1.

FIG. 2 functionally illustrates a video decoder corresponding to the generic video encoder of FIG. 1. The encoded video data corresponding to the encoder output data is input into the data input controller 30 which appropriately separates and routes the video data and the motion estimation data in addition to extracting other information (e.g., control data) which was merged into the data stream by the encoder's data output controller 24. Bus 34 connects the data input controller to the motion compensation processor 32 for communication of the motion estimation parameters as well as control information and timing signals. The decoder 31 reverses the data encoding process from video data encoder 23 transferring the resultant frame data to decoder motion compensation processor 32 which generates a current data frame by appropriately combining this data with the stored information for the previous frame according to the motion estimation data. As it is generated, the current frame data is simultaneously stored within the motion compensation processor 32 for subsequent processing and transferred to the video display controller 33.

The preferred embodiment specific to the present invention of a method and system for video motion compensation is now set forth. Referring again to FIG. 1, in the encoder frame motion estimation processor 22 is performed on the luminance data to approximate the relative motion between adjacent video data frames. The frame motion estimation processor 22 outputs a single value which indicates the horizontal (x) and vertical (y) offset of the current frame which best matches the previous frame, with a maximum compensation of ±16 pixels in each the horizontal and the vertical dimension, and with ½ pixel resolution.

In the present embodiment, consistent with the referenced encoder application, the motion estimation calculation is implemented in a binary search strategy to find the overall interframe translation. First, an array of pixel "patches", each patch comprised of a 16×16 pixel array, is superimposed on a succeeding frame and the absolute difference of each pixel is calculated and accumulated. The patches are then spatially shifted together 16 pixel locations in both the x and y dimensions. The patches are again differenced from the superimposed frame image and this process of shifting and differencing is performed for each of the four possible directions (+x +y, +x −y, −x +y, −x −y). The best match of the five accumulations is used as the origin for another set of four calculations, using an eight pixel displacement. The process repeats for four and two pixel translations. When the one pixel translation is calculated, the four possible horizontal only and vertical only shifts are calculated in addition to the four diagonal shifts. One-half pixel resolution is achieved by creating a ½ pixel resolution sub-image around the final search area of the patches and calculating the difference for a ½ pixel shift in all eight possible shift positions. The ½ pixel image is generated by spatially averaging the pixels in a patch in horizontal, vertical, and one diagonal dimension. The resulting frame offset values indicate the overall displacement which minimizes the cumulative interframe difference for the sampled patches; however, if the difference exceeds an arbitrary, adjustable threshold then a scene change is indicated, thereby resetting the spatial/differential frame sequence.

With the frame offset values, the motion estimation processor transfers these values to the frame motion compensation 21 and further calculates two separate pairs of frame adjustment numbers: the relative block displacement (RBD) pair, and the absolute pixel adjustment (APA) pair. The RBD value for each dimension indicates the integer number of blocks corresponding to the frame offset value with a range from −2 to +2 blocks, while the APA value indicates the fractional relative subblock motion with a range from −4 to +4 pixels in ½ pixel increments. The RBD value and a rounded APA values are transferred to the data output controller 24 for insertion into the data stream in the packet corresponding to the frame undergoing motion compensation for use by the decoder motion compensation circuitry.

In order to accurately calculate the new frame RBD and APA values which account for the ½ pixel averaging which occurs in the frame motion compensation circuitry 21, the calculates and stores a fractional APA value. The current RBD numbers, M and N, corresponding to the x and y directions, respectively, are each found by adding the previous APA number to the motion estimation value and rounding the result to the nearest multiple of 8 pixels (i.e., the nearest block). To find the current APA number, 8 times the current RBD (i.e., 8M) is subtracted from the motion estimation value and added to the previous APA value.

As an example, assume that the frame motion estimation values are 6.5 pixels and −15 pixels in the x and y directions, respectively, (this can be denoted as [6.5,−15]), while the previous APA values are represented as [−2, 1.5].Adding the previous APA values to the motion estimation values yields a relative displacement of 4.5 pixels in the x direction and −13.5 in the y direction (i.e., [4.5,−13.5]). Rounding these numbers to the nearest multiple of 8 yields the RBD values—which are the multiples themselves—and, in this example, are [1,−2]. The current APA values are calculated by subtracting 8 times the current RBD value (i.e., [8,−16]) from the motion estimation values, [6.5,−15], and adding the previous APA value, yielding [−3.5,2.5]. The fractional APA values are stored for subsequent RBD and APA calculations while a rounded integer APA value is generated for transmission to the decoder via the data output controller 24. In accordance with the encoder motion compensation pixel averaging convention and the decoder motion compensation which is subsequently described, the APA values are rounded to [−4,2]corresponding to rounding to the lower integer value.

Upon receiving the frame motion estimation X,Y output, frame motion compensation circuitry 21 reframes the data by moving the current data frame by the amount specified by the X,Y values. One-half pixel shifts are reframed by averaging pixel pairs in the horizontal and/or vertical dimensions, depending on the direction of the frame shift. By convention, the pixel averaging operation replaces the current pixel by the average of the pixel itself with an adjacent pixel to the right or down for horizontal or vertical averaging, respectively. "Bare edges", which occur at the edges opposite to the shift direction, are filled with data corresponding to the adjacent, original edge pixels. The resultant image of the reframing process becomes the reference frame for the motion estimation calculation on the subsequent frame. For interframe difference frames, the reframed image is differenced pixel-by-pixel with the preceding frame to produce an output difference signal which is furnished to the video data encoder 23 for subsequent coding of spatially differential information.

Figure 3:
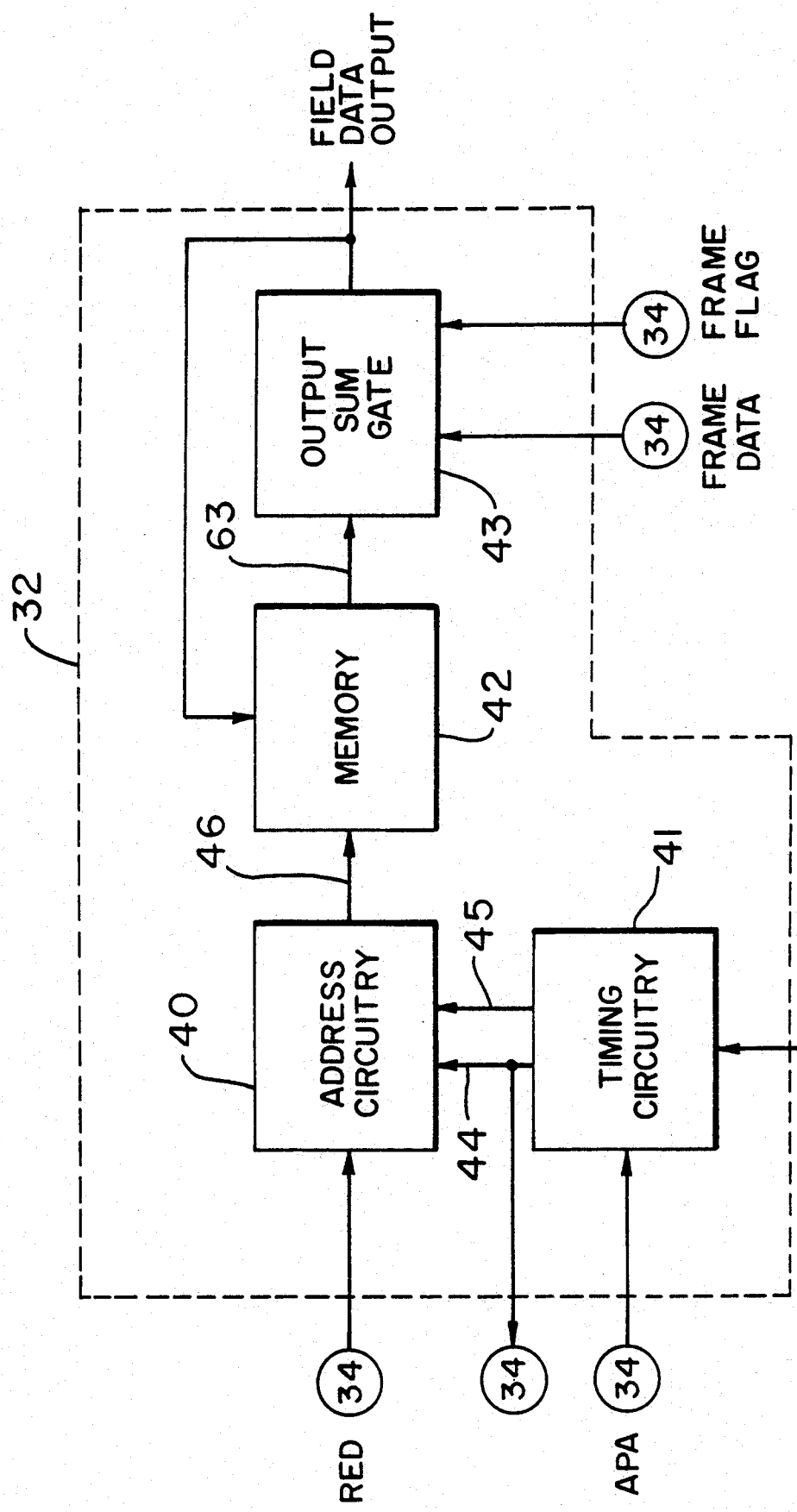
FIG. 3 is a detailed functional block diagram of the motion compensation circuitry within the decoder according to the present invention.

The decoder receives the reframed interframe difference data in conjunction with the RBD and rounded APA values and the motion compensation processor 32 locally generates a new video frame. FIG. 3 functionally illustrates the motion compensation processor circuitry 32 which comprises a memory 42, address circuitry 40 which is triggered by timing circuitry 41, and output sumgate circuitry 43. Using the RBD signal, the address circuitry 40 generates the appropriate block address for accessing the memory with the appropriate timing relative to the vertical synchronization pulses provided by timing circuitry 41 via address triggering signal 44. Timing circuitry 41 receives a sync signal 35 from video display controller 33. This timing control provides the subblock motion compensation by offsetting the starting point for the current data frame based on the APA value. The data output from memory 42 is summed with the differential frame data in output sumgate circuitry 43, and the resulting sum is simultaneously output to the video display controller and fed back for storage into memory 42 as the reference frame for subsequent differential frames. When a spatial frame is transmitted, the encoder sets the RBD and APA values to zero and the frame flag signal disables gating of the memory output and thus, the spatial data passes directly through the output sumgate circuitry 43 and is written into memory 42 with no block offset. When a spatial data frame is transmitted by the encoder, the encoder also sets the RBD and APA to zero, thus allowing writing of the entire spatial frame into the decoder memory 42.

Figure 4:
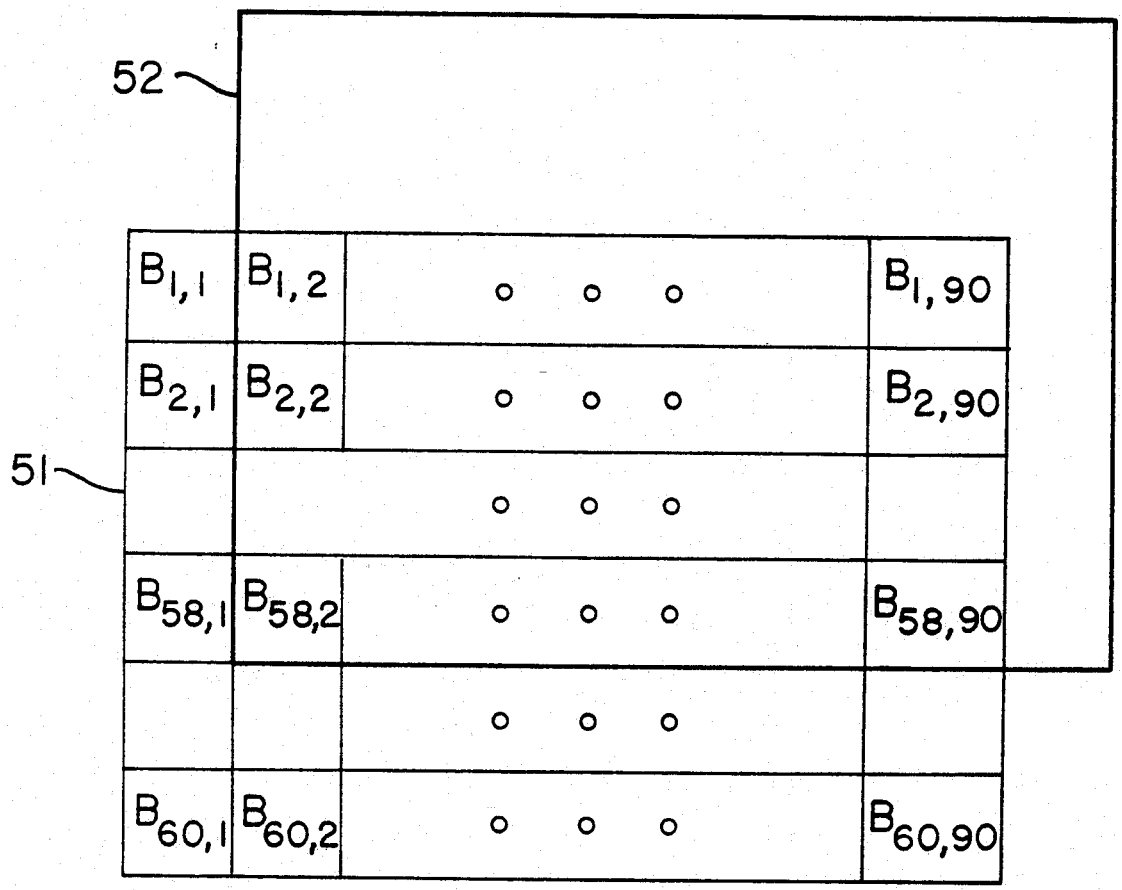
FIG. 4 schematically depicts the logical memory structure, according to the present invention, corresponding to a video frame and the relative block shift with respect to a subsequent frame.

In the preferred embodiment, the memory is logically organized, as shown in FIG. 4, as an array of 90×60 blocks of 8×8 pixels corresponding to the spatial arrangement of the video display. As described above, the memory initially contains a spatial data frame which is updated frame-by-frame by adding differential frame data until another spatial frame is transmitted by the encoder. In accordance with the gridlocked method, the RBD values provide the relative offset to the address for accessing the memory. For example, for a RBD of [p,q], addressing the location of a block $B_{i,j}$ in the new frame 52 requires addressing memory location $B_{j+p,j+q}$ of the old frame 51. This allows writing to and reading from an unaltered memory structure by altering the row and column addresses. In FIG. 4, the relative block displacement of [1,−2] results in data being read from and written back into only the region intersected by new frame 52 and old frame 51, with the frame area to the left and bottom of this region not within the current frame. Since the periphery of the frame is not usually visible on the video display and also forms a small fraction of the image, the frame area to the right and top of the intersected region is left blank in the current frame.

Figure 5:
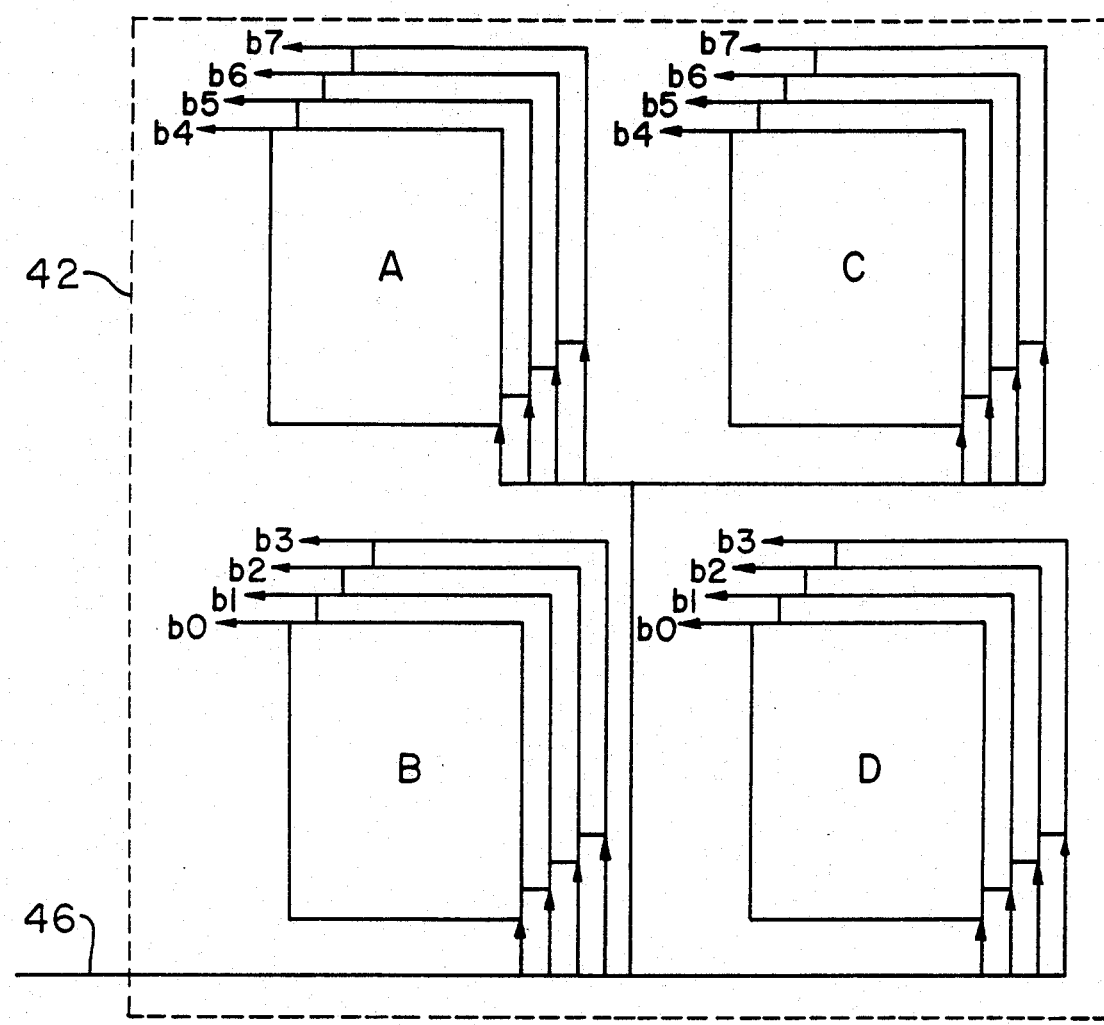
FIG. 5 illustrates the physical memory structure using 512×512 bit DRAMs according to an embodiment of the present invention.

Although the logical structure of the memory 42 highlights the block motion compensation method, FIG. 5 illustrates a physical embodiment for the memory organization using conventional DRAMs. Four memory banks, A, B, C, and D, each contain four 512×512 bit DRAMs and are both addressed by a common address bus. One row of the memory banks contains the pixel data for 16 blocks of 8×8 pixels. For example, blocks $B_{1,1}$, $B_{1,2}$... $B_{1,16}$ in FIG. 4 are contained in the first row commonly addressed in the four memory banks. For a given address location, memory bank A contains the four most significant bits (i.e.. b4, b5, b6, b7) for a pixel while bank B contains the four least significant bits (i.e.. b0, b1, b2, b3) for that pixel. Similarly, for the same address location, memory bank C contains the four most significant bits for an adjacent pixel while bank D contains the four least significant bits for that pixel.

Figure 6:
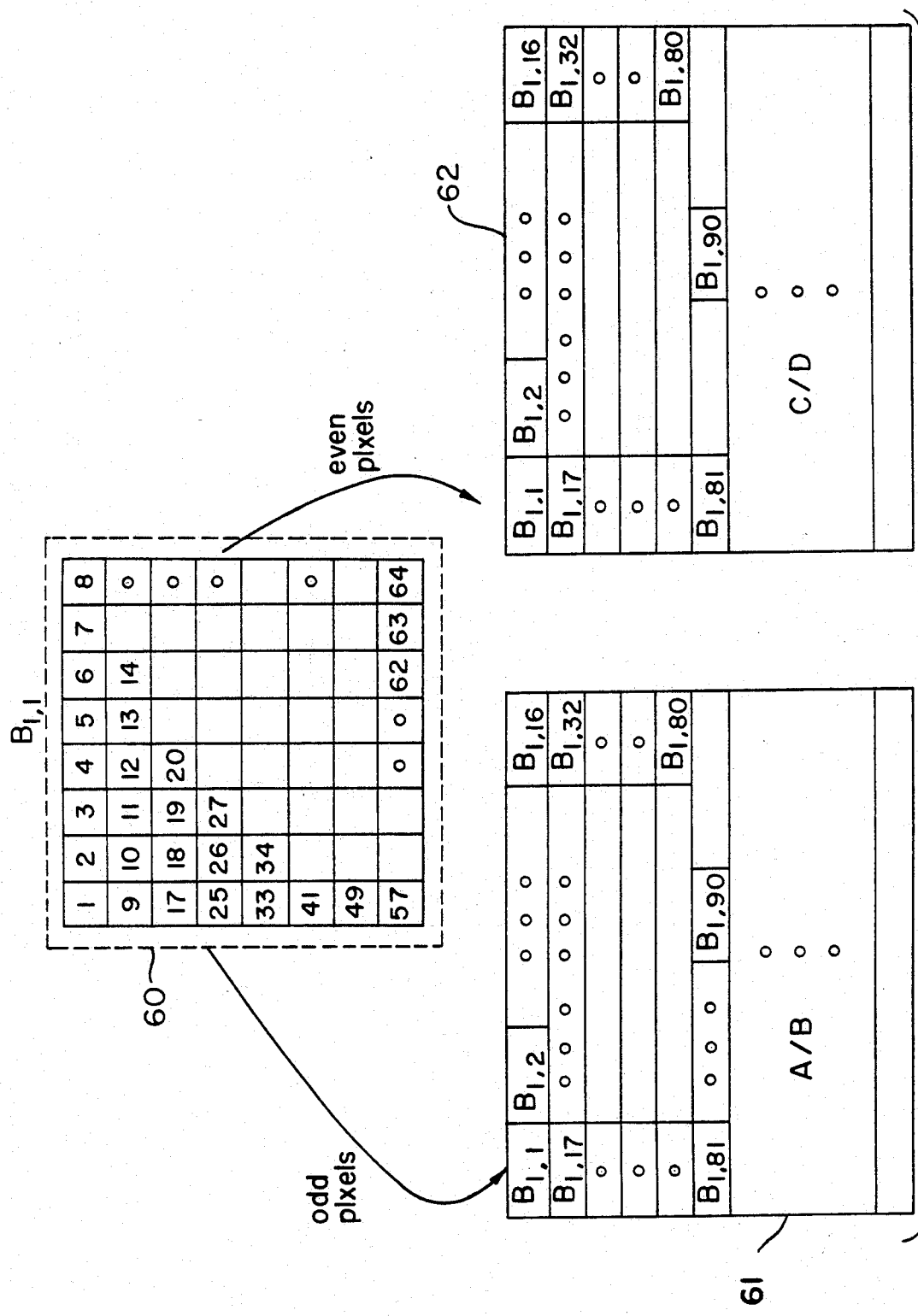
FIG. 6 schematically illustrates the physical memory organization with respect to blocks of 8×8 pixels according to an embodiment of the present invention.

FIG. 6 more clearly illustrates the block and pixel organization in the physical memory structure described in FIG. 5. The pixels of one block 60, corresponding to $B_{1,1}$ in FIG. 4, are enumerated 1 to 64, and also shown is a schematic representation of composite memories 61 and 62 corresponding to memory bank pair A and B and memory bank pair C and D, respectively, of FIG. 5. The first 32 columns of the first row in composite memory 61 contain the pixel data for the odd pixels of block 60 ($B_{1,1}$) while the commonly addressed composite memory 62 contains the pixel data for the 32 even pixels of block 60. (Recall, according to FIG. 5 that each column of each composite memory has a depth of eight bits). Also shown, the first row contains data for the first sixteen blocks and therefore, six memory rows are required to store the 90 blocks which comprise one video line. Thus, the address circuitry increases the column address by 32 for each unit horizontal relative block displacement and increases the row address by 7 for each unit vertical block displacement. This block structured memory is consistent with the gridlock method and is well suited for page mode memory access, thereby decreasing overall memory access time.

According to this physical memory embodiment, one memory access actually results in output for two adjacent pixels on bus 63. In this case, output sum gate 43 of FIG. 3 also receives the frame data in pixel pairs and processes two pixels in parallel. The output data pair is written back into memory 42 and simultaneously output to video display controller 33 which appropriately time multiplexes the pixel information. A further detail of the address circuitry 40 is that the addressing sequence is performed in video raster field format: alternating video frame lines are accessed from memory by appropriately accessing the block format data.

Figure 7:
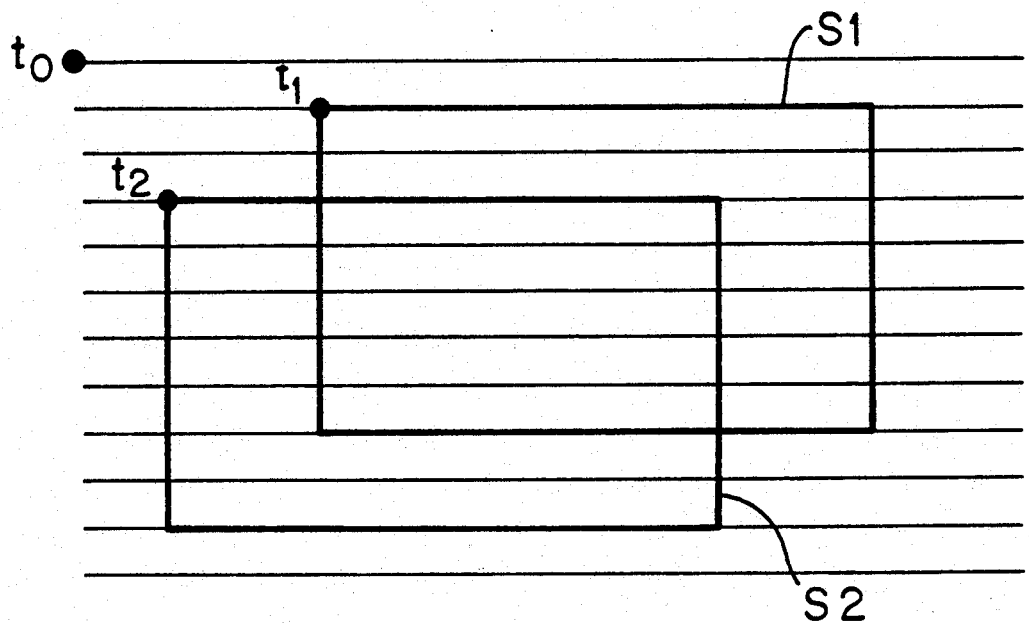
FIG. 7 illustrates the total frame with respect to two temporally adjacent visible frames and the pixel time adjustment for the subblock motion compensation between the visible frames according to the present invention.

In conjunction with the relative block displacement, the decoder motion compensation processor circuitry 32 uses the rounded APA value to control subblock motion. The fractional APA values are not required by the decoder since ½ pixel averaging is performed by the encoder. The subblock motion is accomplished by adjusting the starting time for the pixel data output relative to the vertical synchronization pulse. As schematically depicted in FIG. 7, the total frame consists of lines of pixels starting at time $t_0$ and is scanned 24 or 30 times per second, each frame separated by a vertical blanking (sync) signal. The visible frame S1 is located within the total frame and in order to shift the frame to visible frame S2 the starting point must be delayed by the difference $\delta t \equiv t_2 - t_1$. For an even line APA displacement, $\delta y$, the delay time is calculated within the timing circuitry 41 according to the equation:

$$\delta t = \tfrac{1}{2}\delta y T_L + \delta x T_p$$

where T: is the time to display one line, $T_p$ is the pixel time, and $\delta y$ and $\delta x$ are the rounded APA values for the y and x directions, respectively. If the interframe APA line difference, $\delta y$, is an odd value then a field switch occurs and the delay time is instead calculated according to the equation:

$$\delta t = [\delta y \pm 1]\frac{T_L}{2} + \delta x T_p$$

where the + sign is considered when switching from field 2 to field 1, and the − sign used when switching from field 1 to field 2. This sign convention is consistent with and accounts for the vertical pixel averaging convention employed by the encoder in which a pixel is replaced with the average of the original pixel and the pixel below it and the rounded APA value is rounded to the lower integer value. The starting field is indicated to the address circuitry 40 via field flag signal 45.

The timing circuitry 41 receives the rounded APA values, calculates the delay according to the above equations and compares the result, which is stored in a register, to the output from a counter which is reset by the sync pulse received from the video display controller 33. When the elapsed counter time equals the calculated delay, the timing circuitry 41 triggers address circuitry 40 via address triggering signal 44 in order to initiate memory readout and also triggers the data input controller 30 via bus 34 to initiate frame data readout from a FIFO to the output sum gate circuitry 43. As previously described, the differential frame data is combined with the stored frame data and output to the video display controller 33 and stored in memory 42 as the new reference frame. The combination of the relative block displacement memory addressing format, the pixel delay compensated subblock motion, and the pixel averaging in the encoder yield a motion compensated output frame which possesses ½ pixel horizontal and ½ line vertical resolution.

It may be recognized that the overall motion compensation could be accomplished by reading the entire memory array with the total offset achieved by controlling the relative synchronization timing instead of a combination of block displacement and timing. This method, however, would require much more accurate timing since the timing delay would be multiplied by the total displacement in each direction, magnifying any inherent timing error and thereby causing visible artifacts. Dividing the motion into relative block motion and timing controlled subblock motion overcomes this difficulty.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope. For example, the circuit design of the functional circuit blocks may vary considerably. In addition, a different method may be used for motion estimation. Also, the physical memory organization can be modified in numerous ways; for example, by using 1 Mbit DRAMs with four data bits per column access each bank can be replaced by a single 1 Mbit DRAM. Also, the number of CASs per RAS may be modified or, as an example of further refinement, may even be made variable by increasing the address circuitry complexity.

These and other changes can be made without departing from the spirit and the scope of the invention and without diminishing its attendant advantages. It is therefore intended that the present invention is not limited to the disclosed embodiments but should be defined in accordance with the claims which follow.

I claim:

1. A video motion compensation method for regenerating a second video frame from a first video frame, each frame represented as an array of pixels, said array subdivided into a plurality of blocks, said method comprising the steps of:
    (a) generating a motion estimation signal representing a displacement between said first and second video frames;
    (b) generating from said motion estimation signal a block displacement signal representing the displacement between said first and second video frames approximated to an integer number of blocks;
    (c) generating from said motion estimation signal an absolute displacement signal, said absolute displacement signal compensating for the discrepancy between said motion estimation signal and said block displacement signal;
    (d) generating a trigger signal delayed from a video synchronization signal according to said absolute displacement signal; and
    (e) accessing a storage device according to said block displacement signal, said accessing initiated by said trigger signal, said storage device containing a representation of said first video frame, output from said storage device representing said re-generated second video frame.

2. The method according to claim 1 wherein the step of reconstructing said re-generated second video frame from said first video frame includes summing stored said first video frame with data representing the difference between said second video frame and said first video frame, wherein corresponding pixels of each frame for calculating said difference are determined according to said motion estimation signal, and corresponding pixel data for calculating said summing is determined according to relative said block displacement signal.

3. A video motion compensation system which compensates for the relative motion between a first video frame and a second video frame, each frame represented as an array of pixels, said array subdivided into a plurality of blocks, comprising:
    (a) a motion estimator adapted to generate a motion estimation signal representative of the horizontal and vertical displacement between said first and second video frames;
    (b) a block displacement signal generator responsive to said motion estimation signal, generating a block displacement signal representing the displacement approximated to the nearest block;
    (c) an absolute displacement signal generator responsive to said motion estimation signal for generating an absolute displacement signal representing subblock motion;
    (d) a timing controller which adjusts the delay between a trigger signal and a video synchronization signal according to said absolute displacement signal, said delay time compensating for the subblock motion between said video frames; and
    (e) an address signal generator for accessing a storage device according to said block displacement signal, said storage device containing pixel information for said first video frame, output from said storage device representing a re-generated second video frame.

4. The system according to claim 3 wherein said storage device is a random access memory (RAM).

5. The system according to claim 4 wherein said RAM is organized such that one row of said RAM contains data corresponding to an integer number of video blocks.

6. The system according to claim 5 wherein said accessing is implemented in a page mode with a plurality of column address strobe signals generated for each row address strobe signal.

7. In a video transmission and reception system, said video transmission system including an encoder and a decoder for processing a sequence of video frames for video display, each frame subdivided into blocks of pixel arrays, said encoder containing a motion compensation system comprising:
    (a) a motion estimation processor adapted to estimate the displacement between a first video frame and a second video frame, and to generate a motion estimation signal representing said displacement;
    (b) a relative block displacement signal generator responsive to said motion estimation signal for generating a relative block displacement signal indicating said displacement rounded to the nearest block;
    (c) an absolute pixel adjustment signal generator responsive to said motion estimation signal for generating an absolute pixel adjustment signal indicating subblock motion representing the discrepancy between said relative block displacement signal and said motion estimation signal;
    (d) a motion compensation processor responsive to said motion estimation signal for reframing one of said video frames;
    (e) a frame differencing processor for generating a difference signal between reframed video frame and other video frame.

8. The system of claim 7 wherein said decoder includes a motion compensation circuit comprising:

(a) a memory for storing a representation of one of said video frames;

(b) timing circuitry for generating a trigger signal delayed from a video synchronization signal controlling said subblock motion by adjusting the starting location of the video frame for video display, the delay generated according to said absolute pixel adjustment signal; and (c) address circuitry for accessing said memory according to said relative block displacement signal, said accessing initiated by said trigger signal;

(d) output gating circuitry for generating an output signal representing a re-generated second video frame corresponding to said second video frame by summing output from said memory with said difference signal, said output signal stored in said memory as reference frame for subsequent frame motion compensation.

9. The system according to claim 8 further comprising ½ pixel and ½ line motion compensation by averaging adjacent pixels in one of said video frames in said motion estimation processor thereby generating said motion estimation signal with ½ pixel and ½ line resolution, and averaging adjacent pixels of one of said video frames in said motion compensation processor according to the motion estimation signal.

10. A method for video motion compensation, compensating for the relative motion between a first video frame and a second video frame, each frame represented as an array of pixels, said array subdivided into a plurality of blocks, comprising the steps of:

(a) estimating the horizontal and vertical displacement between said video frames;

(b) generating from said estimating a relative block displacement vector representing the relative frame motion rounded to the nearest block;

(c) generating from said estimating an absolute displacement vector representing the subblock motion;

(d) accessing a storage device containing pixel information according to the block displacement vector; and (e) controlling the timing between said accessing and a video synchronization signal according to said absolute displacement vector.

* * * * *